United States Patent [19]

Munz

[11] 4,102,522
[45] Jul. 25, 1978

[54] SUPPORTING ELEMENT FOR SUPPORTING MOUNTS IN A SOUND AND SHOCK INSULATING MANNER

[76] Inventor: Erich Munz, Weststrasse 11, 5204 Lohmar 1 - Geber, Fed. Rep. of Germany

[21] Appl. No.: 772,464

[22] Filed: Feb. 28, 1977

[51] Int. Cl.² ............................................. F16F 15/04
[52] U.S. Cl. ........................................ 248/24; 248/350
[58] Field of Search ...................... 248/24, 22, 21, 20, 248/188.9, 346.1, 350, 357; 16/18 R, 42 R

[56] References Cited

U.S. PATENT DOCUMENTS

| 133,520 | 12/1872 | Coles | 248/346.1 |
|---|---|---|---|
| 2,225,093 | 12/1940 | Avery | 248/24 |
| 2,305,790 | 12/1942 | Martin | 248/24 |
| 2,322,946 | 6/1943 | Liabastre | 248/24 |
| 3,311,331 | 3/1967 | Steimen | 248/24 |
| 3,342,447 | 9/1967 | Marsh | 248/350 |

FOREIGN PATENT DOCUMENTS

| 81,276 | 10/1894 | German Democratic Rep. | 248/346.1 |
|---|---|---|---|
| 357,927 | 12/1961 | Switzerland | 248/24 |

Primary Examiner—Marion Parsons, Jr.
Attorney, Agent, or Firm—Walter Becker

[57] ABSTRACT

A supporting element for supporting an article such as a machine, pump, boiler and the like in a sound and shock insulating manner. A load distributing supporting plate with an abutment and with an elastic body is mounted on the bottom side of the supporting plate and is made of oil-resistant rubber material. The abutment is an angle-shaped wall which is formed by an angle-shaped strip on the supporting plate or is formed by a corresponding recess in the supporting plate. Connected to the bottom side of the supporting plate is an elastic body having a portion in the form of a plug which extends through the supporting plate, and if desired projects slightly beyond the top surface of the supporting plate.

2 Claims, 7 Drawing Figures

SUPPORTING ELEMENT FOR SUPPORTING MOUNTS IN A SOUND AND SHOCK INSULATING MANNER

The present invention relates to a supporting element for supporting mounts in a sound and shock insulating manner and more specifically concerns a supporting element of the abovementioned type which comprises a load-distributing supporting plate with abutment and with an elastic body mounted at the bottom side of said supporting plate and made of oil-resistant natural or synthetic rubber.

When mounting machines, pumps, boilers, air conditioners or the like units, supporting elements of the above mentioned type are utilized. One of the main problems encountered when mounting the above mentioned machines and devices consists in the elastic and safe placement of said devices and in the sound insulation thereof.

For safely mounting devices of the above-mentioned type at their respective places, it was heretofore customary to connect the heretofore known supports by screw bolts engaging the device to be mounted. Such a procedure, however, requires relatively much work and still does not always result in a stable mounting of the respective machine or article to be mounted. In addition thereto, due to the metallic connection between the supporting element and the device to be supported thereby, the desired sound insulation cannot be fully realized.

It is, therefore, an object of the present invention so to improve the heretofore known elements of the type involved so that a precise elastic mounting safety will be realized while simultaneously realizing a satisfactory sound insulation.

These and other objects and advantages of the invention will appear more clearly from the following specification in connection with the accompanying drawings, in which.

This supporting element according to the present invention comprises a load-distributing supporting plate with abutment and with an elastic body connected to the bottom side of the supporting plate. The elastic body is made of oil-resistant natural or synthetic rubber material characterized primarily in that said abutment forms an angled strip in the plane of the supporting plate. Furthermore, the supporting plate has at least one opening extending there through; the elastic body extends through said opening and projects slightly beyond the top surface of the supporting plate.

Figure 1:
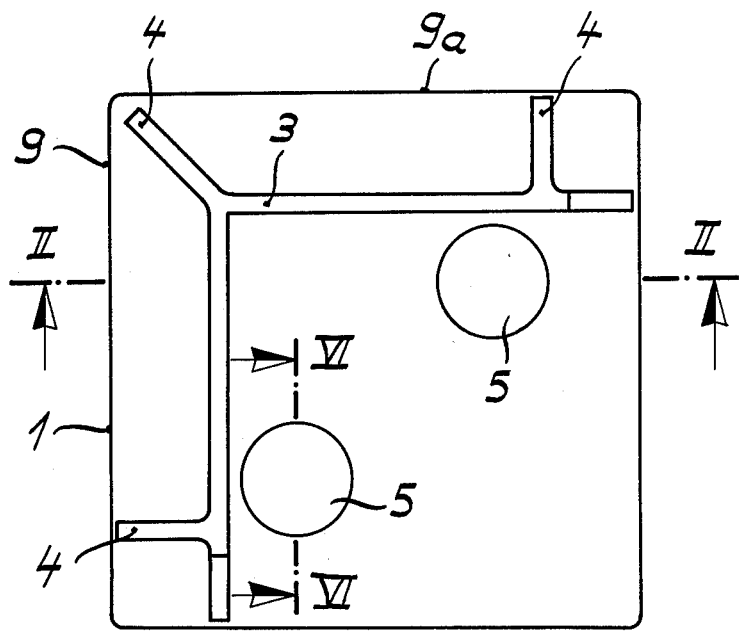
FIG. 1 is a top view of one embodiment of a mounting according to the invention.
Figure 2:
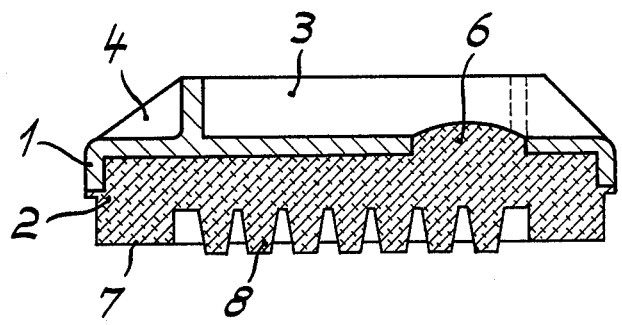
FIG. 2 represents a section taken along the line II—II of FIG. 1.
Figure 3:
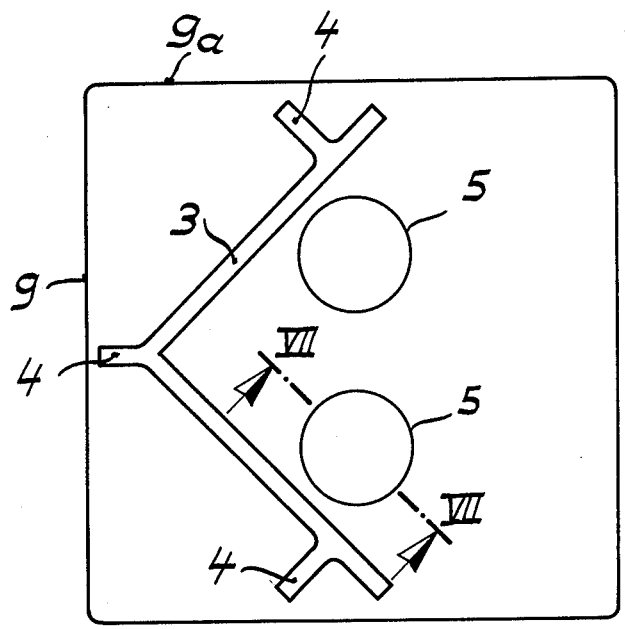
FIG. 3 is a modified support according to the invention.

Referring now to the drawings in detail, the supporting element according to the invention primarily comprises a metallic part 1 and a part 2 of natural or synthetic rubber material. The rubber material is vulcanized to said metallic part 1. Part 1 represents the supporting plate proper. Connected to the top side of the supporting plate 1 is an angle strip which forms an angle abutment 3. The angle strip is reinforced toward the outside by ribs 4. The supporting plate 1 is provided with two bores 5 through which the part 2 of rubber material is passed with an upward extension forming a plug 6. The part 2 of rubber material at its bottom side is provided with a plane surface rim 7 which surrounds serially arranged nubs or protuberances 8. The design of the part 2 of rubber material of the supporting elements is shown in the various embodiments for the sake of simplicity as being the same. While with the embodiment of FIG. 1, the legs of the angle of the angle abutment 3 extend parallel to the lateral confinements 9 and 9a of the metallic part 1, according to the embodiment of FIG. 3, the legs of the angle of the angle abutment 3 are offset relative to the lateral confinements 9, 9a by 45°.

Figure 4:
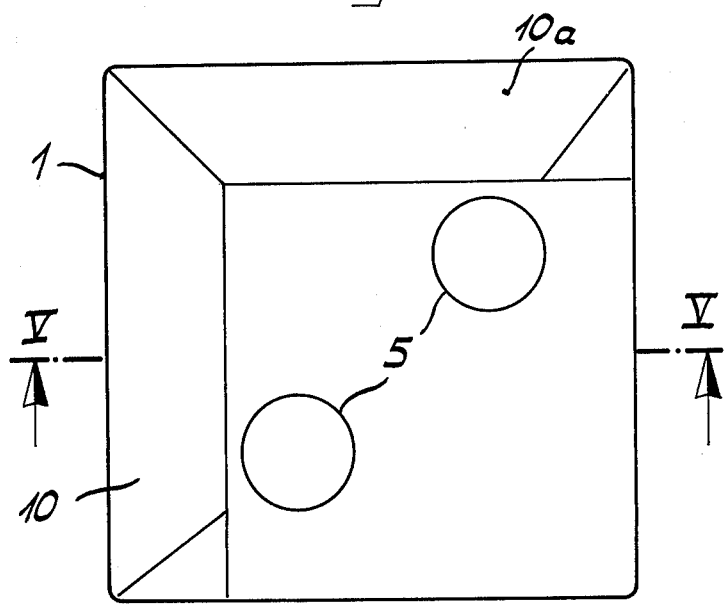
FIG. 4 represents a still further modifications of the support according to the invention.
Figure 5:
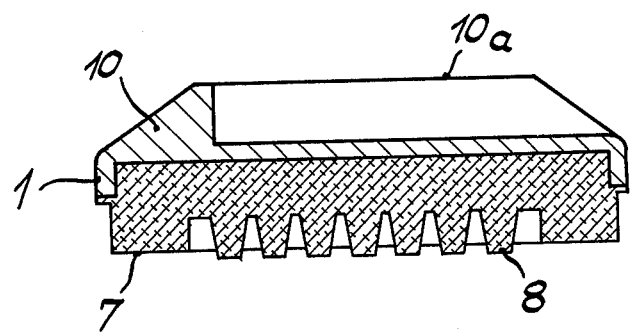
FIG. 5 is a section taken along the line V—V of FIG. 4.

The design of the angle abutment 3 according to the embodiment of FIGS. 4 and 5 may be such that the metallic part 1 is recessed. The elevations 10 and 10a form the angle abutment. The remaining construction corresponds to the embodiment of FIG. 1. It is a matter of course that also when recessing the metallic part 1, in other words, without utilizing a special rib-like strip, the recess may be so arranged that the angle abutment is offset by 45° relative to the metallic part 1. Also, angle sizes other than 45° are possible.

Figure 6:
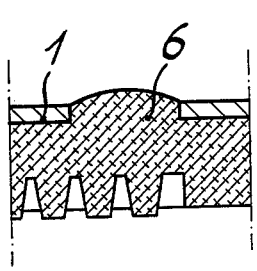
FIG. 6 is a partial section taken along the line VI—VI of FIG. 1.
Figure 7:
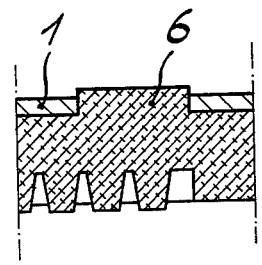
FIG. 7 is a partial section taken along the line VII—VII of FIG. 3.

The plugs 6 which extend through the metallic part 1 in the bore 5 at the top side may be arched as shown in FIG. 6 or plane as shown in FIG. 7.

The metallic part 1 may be cast; in such instance, the angle abutment in the above mentioned designs forms a single piece with the metallic part 1. There also exists the possibility of welding the angle abutment onto the metallic part 1.

As will be ascertained from the above, the advantage of a support according to the invention consists primarily in that due to the angle abutment, the mounting safety is fully assured. A horizontal movement of the unit equipped with the support arranged at the bottom side of the unit is no longer possible because the unit with its fixed confinements will engage the angle abutment. The arrangement of the support according to the invention is effected at the corners of the unit to be mounted while the angle arms of the angle abutment always are located on the outside.

The horizontal movement of the unit to be mounted is counteracted during the operation of the device by the fact that the support, as seen from the unit, is effected primarily by means of parts 6 of the rubber material which projects slightly beyond the surface of the supporting plate. At the bottom, the respective mounted machine or article is safeguarded against horizontal movements by the specific design of the plate of rubber material which is connected to the bottom side of the supporting plate. The plate of rubber material comprises a wide marginal piece and inwardly located nubs which project slightly beyond the marginal area. When the arrangement is subjected to pressure loads, such high frictional forces become effective, that a horizontal movement can no longer occur.

With regard to the sound insulation of the mount, an optimum is realized in view of the fact that the parts of rubber material extending beyond the top side of a supporting plate represent a sound-impeding connection which at the bottom side is aided by an exclusive support of rubber material.

It is, of course, to be understood that the present invention is, by no means, limited to the specific showing in the drawing, but also comprises any modifications within the scope of the appended claims.

What I claim is:

1. A separate unitary supporting element for supporting relatively heavy objects and machines in a sound and shock insulating manner, which includes in combination: a load distributing supporting plate having a top side and a bottom side, an angle-shaped abutment means fixedly connected to the top side of said supporting plate, comprising a pair of upwardly extending flanges arranged at an angle to each other and spaced inwardly from the periphery of said plate and reinforcing ribs integral with the outer sides of said flanges between said flanges and said periphery, and an oil resistant elastic body of elastomeric material fixedly connected to the bottom side of said supporting plate therebelow and having extension means extending through and above the top side of said supporting plate, said elastic body having serially arranged spaced nubs surrounded by a peripheral rim projecting from said bottom side of said elastic body.

2. A supporting element in combination according to claim 1, in which said supporting plate has a plurality of perforations through which said extension means extend in the shape of plugs and slightly project above said top side of said supporting plate.

* * * * *